(12) United States Patent
Takano et al.

(10) Patent No.: US 8,038,179 B2
(45) Date of Patent: Oct. 18, 2011

(54) THREADED JOINT FOR STEEL PIPES

(75) Inventors: Takahiro Takano, Wakayama (JP);
Shigeo Nagasaku, Nishinomiya (JP);
Masaaki Sugino, Nishinomiya (JP);
Takahiro Hamamoto, Wakayama (JP);
Suguru Yamaguchi, Amagasaki (JP)

(73) Assignees: Sumitomo Metal Industries, Ltd.,
Osaka (JP); **Vallourec Mannesmann Oil
& Gas France**, Aulnoye-Aymeries (FR)

( * ) Notice: Subject to any disclaimer, the term of this patent is extended or adjusted under 35 U.S.C. 154(b) by 0 days.

(21) Appl. No.: 12/748,562

(22) Filed: Mar. 29, 2010

(65) Prior Publication Data

US 2010/0270793 A1 Oct. 28, 2010

Related U.S. Application Data

(63) Continuation of application No. PCT/JP2008/068048, filed on Oct. 3, 2008.

(30) Foreign Application Priority Data

Oct. 3, 2007 (JP) ................................. 2007-259852

(51) Int. Cl.
*F16L 15/00* (2006.01)
(52) U.S. Cl. ...................................................... 285/333
(58) Field of Classification Search .................. 285/333, 285/334
See application file for complete search history.

(56) References Cited

U.S. PATENT DOCUMENTS

| 2,992,019 A | * | 7/1961 | MacArthur | 285/334 |
| 2,992,021 A | * | 7/1961 | Nay | 285/334 |
| 4,624,488 A | | 11/1986 | Furgerson | |
| 4,795,200 A | | 1/1989 | Tung | |
| 6,478,344 B2 | * | 11/2002 | Pallini et al. | 285/333 |
| 6,511,102 B2 | * | 1/2003 | Krug et al. | 285/333 |
| 7,334,821 B2 | * | 2/2008 | Dutilleul et al. | 285/333 |

FOREIGN PATENT DOCUMENTS

| JP | 57-122883 | 1/1956 |
| JP | 58-157087 | 10/1983 |
| JP | 2002-507685 | 3/2002 |
| JP | 2006-526747 | 11/2006 |
| WO | 2004/109173 A1 | 12/2004 |

* cited by examiner

*Primary Examiner* — David E Bochna
(74) *Attorney, Agent, or Firm* — Clark & Brody (57) ABSTRACT

A threaded joint for steel pipes comprising a pin 1 having a tapered male thread 11, a tapered sealing surface 13, and an end shoulder surface 14 and a box 2 having correspondingly a tapered female thread 21, a tapered sealing surface 23, and a shoulder surface 24 which is capable of easy tightening and has improved air tightness by the sealing surfaces is arranged such that the pin and the box each have a noncontacting region B where the peripheral surfaces of the pin and the box do not contact each other between the sealing surfaces 13, 23 and the shoulder surfaces 14 and 24. At least a portion of the noncontacting region of the pin adjoining the to end of the pin is a tapered surface portion 18 having substantially the same angle of slope as the tapered sealing surface 13, and the noncontacting region of the box is a substantially cylindrical surface.

20 Claims, 3 Drawing Sheets

THREADED JOINT FOR STEEL PIPES

This application is a continuation of International Patent Application No. PCT/JP/068048, filed Oct. 3, 2008. This PCT application was not in English as published under PCT Article 21(2).

TECHNICAL FIELD

This invention relates to a threaded joint for use in connecting steel pipes such as oil country tubular goods (OCTG), which include tubing and casing generally used for the exploration of and production in oil wells and gas wells, riser pipes, and line pipes. More particularly, the present invention relates to a threaded joint for steel pipes which has a threaded portion as well as a sealing surface and a shoulder surface and which has excellent sealing ability against pressure.

BACKGROUND ART

Threaded joints for steel pipes, such as oil country tubular goods and riser pipes, which are widely used in installations of the oil-producing industry are constituted by a pin which is a male threaded element provided on the end portion of a first tubular member and a box which is a female threaded element provided on the end portion of a second tubular member. Connection is carried out by threaded engagement of the male thread and the female thread, which are both tapered threads.

The first tubular member is typically a pipe such as an oil country tubular good, and the second tubular member is typically a separate member in the form of a coupling. (This type of threaded joint for steel pipes is referred to as a coupling type.) In this type, a pin is formed on both ends of the pipe, and a box is formed on both sides of the coupling. There are also integral threaded joints for steel pipes in which a pin is formed on the outer surface of one end of a pipe and a box is formed on the inner surface of the other end of the pipe. In this type, the first tubular member is a first pipe and the second tubular member is a second pipe.

In the past, oil country tubular goods were connected primarily using standard threaded joints prescribed by API (American Petroleum Institute) standards. However, in recent years, as the environments for excavation and production of crude oil and natural gas are becoming more severe, high-performance special threaded joints referred to as premium joints are being increasingly used.

In a premium joint, the pin and the box each have, in addition to a tapered thread which enables connection, a sealing surface provided on the peripheral surface in the vicinity of the threaded portion and a shoulder surface which functions as a stopper which undergoes abutment during make-up of the joint. Radial interference is provided between the sealing surfaces of the pin and the box. When a threaded joint is tightened until the shoulder surfaces of the pin and the box abut each other, the sealing surfaces of these two members intimately contact each other around the entire periphery of the joint and form a seal by metal-to-metal contact. In addition to acting as abutting stoppers at the time of make-up, the shoulder surfaces perform the function of bearing a compressive load during use of the joint.

Figure 1:
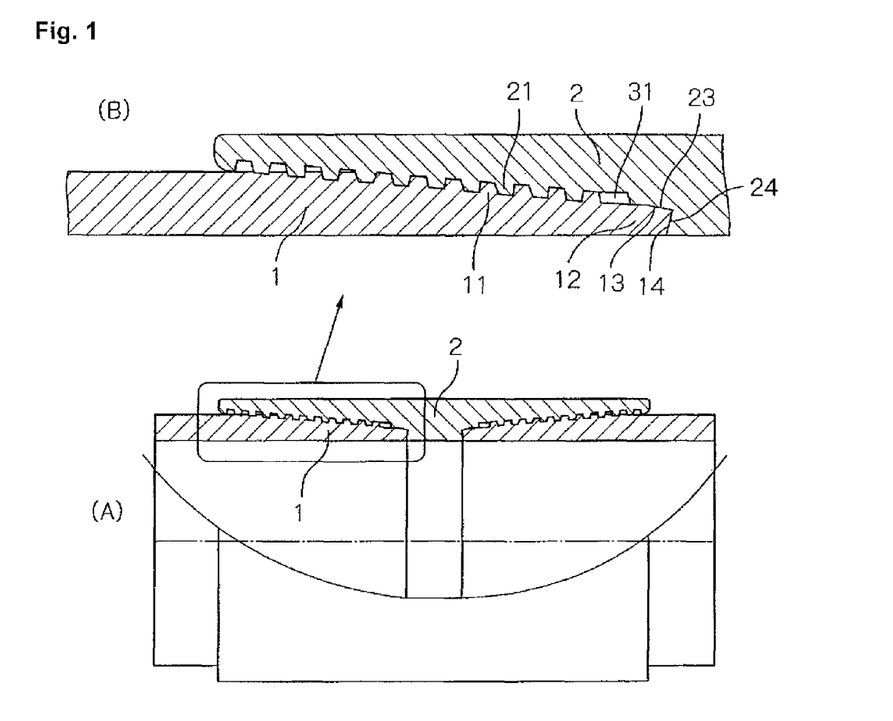
FIG. 1(A) shows an explanatory schematic view in the axial (longitudinal) direction of a typical conventional threaded joint for steel pipes of the coupling type referred to as a premium joint and FIG. 1(B) shows a partially enlarged view of the vicinity of the end of the pin of this joint.

FIG. 1 is a schematic explanatory view of a typical premium threaded joint for steel pipes of the coupling type. FIG. 1(A) is an overall view, and FIG. 1(B) is an enlarged view of a portion thereof. As shown in FIG. 1(B), this threaded joint for steel pipes has a pin 1 which is a male threaded element provided on the end of a pipe and a box 2 which is a corresponding female threaded element provided on both sides of a coupling. The pin 1 has on its outer surface a tapered male thread 11 and an unthreaded cylindrical abutting portion 12 called a lip (referred to below as a lip portion) provided on the end of the pin and adjoining the male thread 11. The lip portion 12 has a sealing surface 13 on its outer peripheral surface and a shoulder surface 14 on its end surface. The sealing surface 13 is a tapered surface (frustoconical surface) which gradually decreases in diameter towards the end of the pin.

The opposing box 2 has on its inner surface tapered female thread 21, a sealing surface 23, and a shoulder surface 24 which can threadingly engage with or contact or abut with the tapered male thread 11, the sealing surface 13, and the shoulder surface 14, respectively, of the pin 1.

As shown in the drawings, the lip portion, which has a shoulder surface on its end, is mostly provided on the end portion of the pin. In addition to serving as a stopper (torque shoulder) during tightening, the shoulder surface bears compressive loads acting on the joint.

When vertical wells were predominant, a threaded joint for steel pipes had sufficient performance if it could withstand the tensile loads due to the weight of the pipes connected thereto and could prevent leaks of high pressure fluid flowing along its interior. However, in recent years, wells are becoming deeper and the number of sloping wells or horizontal wells which bend or curve under the ground increases. In addition, oil wells in severe environments such as in the sea or polar regions are being increasingly developed. Accordingly, there is a strong demand for threaded joints for steel pipes to have increased resistance to compression and increased sealing performance particularly in the presence of internal and external pressure.

When external pressure acts on the above-described conventional premium joint, the applied external pressure is transmitted along gaps between the threads and permeates to the location indicated by 31 in FIG. 1(B) just before the sealing surfaces. Since the lip portion 12 has a considerably smaller wall thickness than the pipe body, it sometimes undergoes deformation toward reduction in diameter by the penetrated external pressure. As a result, if the external pressure increases, a situation may develop in which a gap forms between the sealing surfaces, leading to leakage, namely, penetration of exterior fluid to the interior of the pipe body.

When a compressive load acts on a premium joint, such as when an oil country tubular good is installed underground in a horizontal well or a sloping well, with most joints, the gap between the male thread and the female thread is made relatively large in order to facilitate stabbing, as a result of which the ability of the threads to bear a compressive load is low. Therefore, a compressive load is primarily borne by the shoulders. However, the wall thickness of the shoulder surface at the end of the lip portion (the pressure-receiving area for compressive loads) is normally much smaller than that of the pipe body, so when a compressive load corresponding to 40-60% of the yield strength of the pipe body is applied, the lip portion of most premium joints undergoes large plastic deformation, and the sealing ability of the adjoining sealing surface markedly decreases.

In order to increase the sealing ability of a joint against external pressure (external pressure sealing ability), the stiffness of the lip portion of the end of the pin can be increased so as to increase its resistance to deformation toward a reduction in diameter. With this object, a method referred to as swaging in which the wall thickness of the lip portion is increased by axial constriction at the end of the pipe is often used.

However, if the amount of swaging is too great, in the case of connecting casings, a pipe inserted into the interior of the connected casings sometimes catches on the swaged portion, and in the case of connecting tubings, the swaged portion causes turbulence in the fluid such as crude oil which is flowing inside the connected tubing, and this turbulence sometimes causes erosion. Therefore, the amount by which the wall thickness of the pin lip can be increased by swaging is limited.

Other conventional techniques for increasing the stiffness of the end of a pin and increasing sealing performance are described in below-mentioned Patent Documents 1 and 2. These patent documents disclose technology in which sealing performance is increased by installing a cylindrical portion which does not contact the box at the end of the sealing surface of a pin so as to increase the stiffness of the periphery of the sealing surface of the pin against diameter-reducing deformation and producing uniform contact between the sealing surfaces of the joint.

Even if the wall thickness of the lip portion of a threaded joint for pipes is increased by swaging, it is necessary for the threaded joint to provide tapered threads, a sealing surface, and a shoulder surface within a limited wall thickness. However, according to the technology disclosed in the above-described patent documents, the end of the pin does not abut the box, so the shoulder surface must be provided in a location other than the lip, and the lip necessarily becomes thin. Accordingly, there is a limit to the extent to which the stiffness of the lip can be increased so as to resist diameter reducing deformation of the lip caused by external pressure, and a high degree of sealing ability against external pressure cannot be achieved. In addition, because the shoulder surface of the pin cannot be given a sufficient wall thickness, high resistance to compression cannot be obtained, and the sealing performance under a combined load of compression and external pressure is low.

Figure 2:
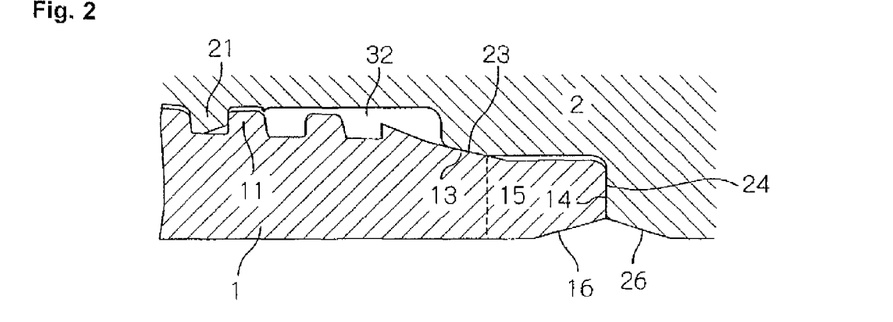
FIG. 2 is a schematic axial cross-sectional view of a conventional threaded joint for steel pipes having a noncontacting region in the lip portion.

As shown in FIG. 2, below-mentioned Patent Document 3 proposes a threaded joint for steel pipes in which, a nose portion 15 which is an extended lip portion is provided between the sealing surface 13 of a pin 1 and the shoulder surface 14 at the end of the pin. The nose portion 15 of the pin 1 is a noncontacting region which does not contact the opposing portion of the box 2. At the same time, the sealing surfaces 13 and 23 and the shoulder surfaces 14 and 24 of the pin and the box contact each other. By extending the lip portion of the pin 1 so as to provide a nose portion 15 having an outer surface with a cylindrical shape (having a constant outer diameter) which does not contact the box in a position closer to the end of the pin than the sealing surface 13 of the pin, the wall thickness of the lip portion having a limited pipe wall thickness and accordingly the wall thickness of the shoulder surface and the sealing surface of the pin can be increased, whereby the resistance to compression and the sealing properties against external pressure of a threaded joint for pipes can be markedly increased.

In the threaded joint shown in FIG. 2, in order to allow the male thread 11 to approach as close as possible to the sealing surface 13, a circumferential groove 32 is provided in the box such that the male thread in a portion closest to the end of the pin does not threadingly engage with the female thread in a position in the vicinity of the sealing surface of the box.

A threaded joint for steel pipes like that proposed in Patent Document 3 which has a noncontacting region on the side of the sealing surface of a pin closest to the end of the pin exhibits adequate sealing performance and resistance to compression even when it receives a tensile or compressive load applied thereon in a state in which internal or external pressure is applied to the threaded joint. However, it has a relatively long nose portion on the side of the sealing surface closest to the end of the pin, with the sealing surface having a tapered shape with an outer diameter which gradually decreases towards the end of the pin. Therefore, if the tip of the pin impinges on the box at the time of joint make-up or if it previously impacts some other object, the tip of the pin may deform so as to swell outward. As a result, there is the possibility of it being impossible to further tighten the pin, or even if stabbing and tightening are possible, the sealing properties of the sealing surface may be impaired by the swelling of the tip of the pin such that the gastightness (the sealing performance) of the threaded joint for steel pipes is worsened.

In particular, as shown by 16 and 26 in FIG. 2, when a chamfer is provided on the inner peripheral surface in the vicinity of the shoulder surfaces of the pin and the box with the object of preventing turbulent flow of the fluid flowing in the interior of the joint, the wall thickness of the end of the nose portion becomes thin, and deformation of the end of the pin due to impact with the box occurs more easily.

As the nose portion of the end of the pin is relatively long, there is the danger of the sealing surface of the box being damaged due to deviation of the stabbing angle at the time of stabbing of the pin. In addition, if the outer peripheral surface of the end of the pin is a substantially cylindrical surface, a guide in the direction of stabbing of a pin for correcting deviation of the pin axis with respect to the box axis is not obtained.

Patent Document 1: U.S. Pat. No. 4,624,488
Patent Document 2: U.S. Pat. No. 4,795,200
Patent Document 3: WO 2004/109173

DISCLOSURE OF INVENTION

The object of the present invention is solve the above-described problems which are observed in a threaded joint for steel pipes having a noncontacting region on the side of the sealing surface closest to the end of the pin and accordingly having a relatively long lip portion.

As a result of further study based on the threaded joint for steel pipes described in above-mentioned Patent Document 3, the present inventors discovered that the above-described problems are completely solved by changing the shape of the noncontacting region formed on the side of the sealing surface of a pin closest to the end of the pin so such that at least a portion of the noncontacting region which adjoins the end of the pin is made a tapered surface having essentially the same angle of slope as the sealing surface, instead of a cylindrical surface with a constant outer diameter over the entire noncontacting region.

The present invention is a threaded joint for steel pipes comprising a pin having a male thread, a sealing surface, and an end shoulder surface sequentially arranged from the rear towards the end (tip) of the pin, and a box having a female thread, a sealing surface, and a shoulder surface corresponding to the male thread, the sealing surface, and the shoulder surface of the pin, respectively, wherein the threads are tapered threads and the sealing surfaces are tapered surfaces, characterized in that the pin and the box each have a noncontacting region where the peripheral surfaces of the pin and the box do not contact each other at a position between the sealing surfaces and the shoulder surfaces, and at least the portion of the noncontacting region of the pin adjoining the end of the pin is a tapered surface portion having substantially the same angle of slope as the sealing surface of the pin.

The noncontacting region of the box opposing the noncontacting region of the pin is preferably a substantially cylindrical surface which does not have a tapered surface portion. A substantially cylindrical surface means that a slight slope of at most 1° is permissible, and the corners may be chamfered for the purpose of rounding. The shape of the inner surface of the noncontacting region of the box is not limited as long as it does not interfere with stabbing of the pin and it does not contact the noncontacting region of the pin after make-up. Examples of various shapes which are possible include a reverse tapered shape which spreads towards the end of the pin or a shape which is initially a reverse tapered shape and which changes to a tapered shape which tapers towards the end of the pin. The inner surfaces in the vicinity of the shoulder surfaces of the pin and the box may be chamfered.

The noncontacting region of the pin is preferably constituted by a cylindrical surface portion on the side closest to the sealing surface and a tapered surface portion adjoining the end of the pin (namely, the end shoulder surface of the pin). In this case, the tapered surface portion of the noncontacting region which gradually decreases in outer diameter towards the end of the pin may be (1) formed so that its outer diameter gradually decreases from the end portion of the cylindrical surface portion of the noncontacting region closest to the end of the pin towards the end of the pin, or (2) it may be formed so that its outer diameter increases from the end portion of the cylindrical surface portion closest to the end of the pin towards the end of the pin and then the outer diameter gradually decreases from the portion having an increased outer diameter. In case (1), the cylindrical surface portion and the tapered surface portion are continuous with each other, whereas in case (2), the outer diameter of the pin first increases between the cylindrical surface portion and the tapered surface portion, and as a result the wall thickness of the end portion of the pin increases and a protuberance is formed. Below, the tapered surface portion of case (1) will be referred to as a simple frustoconical surface, and the tapered surface portion of case (2) will be referred to as an arrowhead-shaped frustoconical surface. With the arrowhead-shaped frustoconical tapered surface of case (2), the difference between the maximum outer diameter of the tapered surface portion of the noncontacting region of the pin (the maximum outer diameter of the protuberance) and the inner diameter of the noncontacting region of the box in an opposing location is preferably 0.2-0.4 mm.

It is also possible to make the entire noncontacting region a tapered surface without providing a cylindrical surface portion in the noncontacting region. In this case, the length of the noncontacting region in the axial direction is preferably made short so that the area of the shoulder surface at the end of the pin does not become too small, and the shape of the noncontacting region of the pin is preferably made the above-described arrowhead-shaped frustoconical shape.

A tapered surface is a surface formed by rotating a straight line which is sloped with respect to the pipe axis about the pipe axis. The angle between the sloping straight line and the pipe axis (namely, the angle between the tapered surface and the pipe axis in a cross section in the pipe axial direction) is the angle of slope of the tapered surface. When the sealing surface and the tapered surface of the noncontacting region have substantially the same angle of slope, it means that the difference between the angles of slope when the angles of slope are different is within approximately 5% of the angle of slope of the tapered surface having the smaller angle of slope. Of course, a difference of at most ±0.5° is permissible as a manufacturing tolerance. The angles of slope of the sealing surface and the tapered surface portion of the noncontacting region of the pin are preferably in the range of 2.5-25°.

A threaded joint for steel pipes according to the present invention has a high stiffness against diameter-reducing deformation of the periphery of the sealing surface of the pin, as is the case with the threaded joint for steel pipes disclosed in above-mentioned Patent Document 3, by providing a noncontacting region on the outer peripheral surface closer to the end of the pin than the sealing surface of the pin. Therefore, even when it is subjected to a tensile or compressive load under internal or external pressure applied to the threaded joint, stress can be borne by the portion of the noncontacting region at the end of the pin, so the sealing performance and resistance to compression at the time of application of a load are improved.

By making at least the portion of the noncontacting region which adjoins the end of the pin a tapered surface having substantially the same angle of slope as the sealing surface, even if the outer peripheral surface of the end portion of the pin contacts the sealing surface of the box at the time of stabbing of the pin, both are tapered surfaces having the same angle of slope, so the mode of contact becomes surface contact. As a result, significant local damage to the sealing surface of the box (such as indentations) is avoided, and the gastightness of the sealing surface is maintained.

In addition, even if the end of the pin is deformed outwards by an impact at the time of contact or collision of the end of the pin with another member (such as a box) during handling such as during transport of the threaded joint or at the time of make-up, the radial gap between the pin and the box at the end of the pin is sufficiently large that interference with make-up due to deformation of the end of the pin is prevented. Therefore, even if deformation of the end of the pin takes place, it is possible to completely tighten the threaded joint so that the shoulder surfaces of the pin and the box contact each other and their sealing surfaces interfere with each other and can exhibit sufficient sealing properties.

In particular, with a pin having an arrowhead-shaped frustoconical tapered surface in which the outer diameter of the pin increases between the cylindrical surface portion and the tapered surface portion in the noncontacting region, if the outer diameter of the end of the pin which is expanded by deformation is smaller than the maximum outer diameter of the tapered surface portion (namely, the outer diameter of the portion which is increased to make a protuberance), complete tightening of a threaded joint can be achieved with certainty. As a result, it becomes possible to easily determine whether make-up is possible when the end of the pin has deformed.

Due to the presence on the end of the pin of a tapered surface of the noncontacting region of the pin having the same angle of slope as the sealing surfaces of the pin and the box, the tapered surface on the end of the pin which first contacts the box inner surface at the time of stabbing of the pin into the box during make-up of a threaded joint acts as a guide, and it becomes easy to align the axes of the pin and the box. Thus, if the tapered surface of the noncontacting region at the end of the pin contacts the sealing surface of the inner surface of the box during stabbing of the pin, the fact that the angles of slope of these two surfaces are the same facilitates that tightening proceeds with the axial directions of the pin and the box aligned. As a result, the danger of damage to the sealing surface due to impact by the end portion of the pin thereon is minimized. The sealing surfaces are the most important portion of the mechanism for maintaining the gastightness of a threaded joint.

With a pin having an arrowhead-shaped frustoconical tapered surface in which the outer diameter of the pin increases between the cylindrical surface portion and the tapered surface portion in the noncontacting region, by making the radial gap between the maximum outer diameter of the protruding tapered surface portion and the opposing inner surface of the box a suitable value (0.2-0.4 mm), the protuberance of the pin becomes a guide for an extremely precise fit, and alignment of the axial directions of the pin and the box at the time of make-up of a threaded joint can be stably and easily achieved.

Even when a threaded joint for steel pipes according to the present invention is applied to a threaded joint used in a sloping location or horizontal location in which make-up tends to be difficult due to misalignment of the pin and box or deformation caused by impacts of the pin, stabbing of the pin into the box and tightening can be easily performed.

LIST OF REFERENCE SYMBOLS IN THE DRAWINGS

A: angle of slope of tapered surface or sealing surface,
B: noncontacting region,
1: pin,
2: box,
11: male thread,
12: lip portion,
13, 23: sealing surface,
14, 24: shoulder surface,
15: nose portion,
16, 26: inner surface chamfer,
17: cylindrical surface portion of noncontacting region of pin,
18: tapered surface portion of noncontacting region of the pin,
18': protuberance,
19: additional tapered surface of noncontacting region,
21: female thread,
32: circumferential groove in box,
33: expanded deformation.

BEST MODE FOR CARRYING OUT THE INVENTION

Below, a threaded joint for steel pipes according to the present invention will be explained while referring to the drawings.

FIG. 3(A) is a schematic cross-sectional view in the axial (longitudinal) direction of the portion close to the end of the pin of one embodiment of a threaded joint for steel pipes according to the present invention.

This threaded joint is of the premium joint type and comprises a pin 1 having a male thread 11, a sealing surface 13, and a shoulder surface 14 at the end of the pin sequentially arranged from the rear towards the end of the pin, and a box 2 having a female thread 21, a sealing surface 23, and a shoulder surface 24 which correspond to (namely, they engage, interfere, or abut with) the male thread, the sealing surface, and the shoulder surface of the pin. The portion of the pin which is closer to the end of the pin than the threaded portion and includes the sealing surface 13 is a lip portion.

The threads are tapered threads. Tapered threads are threads formed on the outer or inner surface of a cone. The sealing surface 13 of the pin is a tapered surface having an outer diameter which gradually decreases towards the end of the pin. The angle of slope of this tapered surface with respect to the pipe axis is A (°). Naturally, the sealing surface 23 of the box is also a tapered surface having the same angle of slope. Due to the interference between these sealing surfaces produced by making the outer diameter of the sealing surface 13 of the pin slightly larger than the inner diameter of the sealing surface 23 of the box, gastightness at the time of make-up of the threaded joint is guaranteed. This interference is normally around 0.4-1.2 mm.

As with the threaded joint described in Patent Document 3 and shown in FIG. 2, a noncontacting region B in which the pin and the box do not contact each other is provided between the sealing surfaces and the shoulder surfaces of the pin and the box. Therefore, the length of the lip portion is increased compared to the typical premium joint shown in FIG. 1 which does not have such a noncontacting region closer to the end than the sealing surface of the pin.

In the joint shown in FIG. 2, the noncontacting region of the pin is a cylindrical surface, namely, a cross section in the axial direction of the pipe has a surface parallel to the pipe axis over substantially the entire length in the axial direction of the pipe except for a short tapered surface portion adjoining the sealing surface (which is necessary in order to guarantee a noncontacting region having a suitable gap from the box). Accordingly, except for both ends of the noncontacting region, the radial gap between the pin and the box is constant in the noncontacting region.

In contrast, in a threaded joint for steel pipes according to the present invention, as shown in FIG. 3(A), the noncontacting region of the pin comprises a cylindrical surface portion 17 having a constant outer diameter on the side closest to the sealing surface and a tapered surface portion 18 adjoining the end of the pin (adjoining the shoulder surface at the end of the pin) and having an outer diameter which gradually decreases towards the end of the pin. In the same manner as in FIG. 2, in order to guarantee a noncontacting region having a suitable radial gap between the box and the pin, the noncontacting region of the pin has an additional tapered surface portion 19 between the sealing surface and the cylindrical surface portion of the noncontacting region of the pin. This additional tapered surface portion 19 is preferably a tapered surface having the same angle of slope as the sealing surfaces 13 and 23 of the pin and the box. In this manner, the sealing surface 13 of the pin and the additional tapered surface 19 in the noncontacting region can be formed by a single machining operation, and processing costs are decreased.

In the same manner as with the threaded joint shown in FIG. 2, the noncontacting region of the box is preferably a substantially cylindrical surface over the entire length from the end of the sealing surface 23 to the shoulder surface 24. As a result, the radial gap between the pin and the box in the noncontacting region B is constant in the cylindrical surface portion 17 of the pin, it increases towards the end of the pin in the tapered surface portion 18, and it is a maximum at the end of the pin.

In the embodiment shown in FIG. 3(A), the tapered surface portion 18 in the noncontacting region of the pin is formed such that its outer diameter gradually decreases towards the end of the pin from the end of the cylindrical surface portion 17 closest to the end of the pin. This shape of the tapered surface is a simple frustoconical shape. The angle of slope A of the tapered surface portion 18 of the noncontacting region of the pin is substantially the same as the angle of slope A of its sealing surface 13. The angle of slope A is preferably in the range of 2.5-25° and more preferably 5-15°.

As shown in FIG. 3(B), when the pin is inserted into the box, the lip portion on the end of the pin first contacts the threaded portion at the end of the box. At this time, with the typical premium joint shown in FIG. 1 which has sealing surfaces located on the end of the pin, there is the danger that the sealing surface of the pin is damaged by contact with the thread of the box. In contrast, in a threaded joint according to the present invention, although the end of the pin is a tapered surface portion having the same angle of slope as the sealing surface, the surface is not a sealing surface and does not contact the box, so even if the tapered surface portion of the end of the pin is damaged, the gastightness of the threaded joint is not impaired.

When the pin is further inserted into the box, as shown in FIG. 3(C), the tapered surface portion at the end of the pin reaches the sealing surface of the box. At this time, as shown in the drawings, even if the tapered surface portion at the end of the pin contacts the sealing surface of the box, the sealing surface of the box has the same angle of slope as the tapered surface portion at the end of the pin, so contact between the sealing surface of the box and the tapered surface of the end of the pin becomes surface contact, and significant local damage to the sealing surface of the box is avoided. As a result, a decrease in the gastightness of the threaded joint due to contact between the sealing surface of the box and the end of the pin is prevented.

Due to surface contact between the end portion of the pin and the sealing surface of the box, the pin and the box are axially aligned, and subsequent tightening of the pin and the box can be carried out in a state in which they are easily aligned. Namely, the tapered surface portion at the end of the pin acts as a guide for maintaining the direction of stabbing of the pin in a suitable direction when it contacts the sealing surface of the box.

When the tapered surface at the end of the pin reaches a position in which it contacts the sealing surface of the box, as shown in FIG. 3(C), the male thread closest to the end of the pin (as shown in the drawings, the male thread in this position may be in the form of incomplete thread which does not threadingly engage with the female thread) is preferably in a state in which it contacts the female thread of the box. As a result, make-up of the threaded joint proceeds with the aligned state which was achieved by surface contact between the tapered surface portion of the end of the pin and the sealing surface of the box maintained with certainty, so make-up becomes even easier.

The end portion of the pin is the portion of a threaded joint for steel pipes having the smallest wall thickness. In particular, as shown in the drawings, the wall thickness of the end of the pin becomes even smaller when the inner surface of the end of the pin is made a tapered surface by chamfering. This chamfering of the inner surface of the end of the pin is provided in order to prevent a step from being formed when the shoulder surfaces of the pin and the box contact, which results in turbulence being produced in a fluid flowing inside the threaded joint and the inner surface of the joint accordingly being damaged by erosion. In this case, a similar chamfer is provided in the inner surface in the vicinity of the shoulder surface of the box.

When the pin is stabbed into the box, the shoulder surface at the end of the pin sometimes contacts the end surface of the end of the box prior to stabbing or contacts or collides with another object during storage or during handling at the time of transport prior to use and sometimes receives an impact and particularly an impact in the axial direction. The wall thickness of the end portion of the pin is small, so when the shoulder surface at the end of the pin receives an impact in the axial direction, the end portion of the pin may be plastically deformed and crushed so as to deform by swelling thereby forming a protrusion 33 at the end of the pin as shown by a dotted circle in FIG. 3(D).

Even if the end of the pin deforms by swelling in this manner, as shown in FIG. 3(D), in the present invention, the radial gap between the pin and the box at the end of the pin can be made sufficiently large to contain this swelling, and make-up of the threaded joint can continue to completion. If the swelling (amount of deformation) of the end of the pin is not too great (specifically, if it is within a range such that the end of the pin does not contact the opposing surface of the noncontacting region of the box), even there is deformation, tightening can be carried out so that the sealing surfaces of the pin and the box completely interfere with each other, so there is no adverse effect on the gastightness (sealing properties) of the threaded joint. In other words, a certain amount of deformation of the end of the pin is allowable. Therefore, even if the pin deforms, make-up of the threaded joint can be continued without it being necessary to replace the pin with a new one, which provides a very great effect on decreasing costs.

FIG. 4(A) is a schematic axial cross-sectional view of the portion close to the end of the pin of a second embodiment of a threaded joint for steel pipes according to the present invention.

The threaded joint for steel pipes shown in FIG. 4(A) is the same as the first embodiment of a threaded joint shown in FIG. 3(A) in that the portion of the pin 1 closer to the end of the pin than the sealing surface 13 is a noncontacting region which does not contact the box, and in that this noncontacting region of the pin 1 has a cylindrical surface portion 17 on the side adjoining the sealing surface and a tapered surface portion 18 which continues from the cylindrical surface to the shoulder surface on the end of the pin. Portions other than the noncontacting region of the pin are basically the same as in the first embodiment of a threaded joint such as with respect to the threaded portions 11 and 21, the sealing surfaces 13 and 23, the shoulder surfaces 14 and 24, and the optional inner surface chamfered portions 16 and 26. The inner surface of the noncontacting region B of the box comprises a cylindrical surface over substantially the entire length in the same manner as in FIG. 3(A).

The second embodiment of a threaded joint shown in FIG. 4(A) differs from the first embodiment of a threaded joint in that in the noncontacting region of the pin 1, its outer diameter increases at the end of the cylindrical surface portion 17 closer to the end of the pin towards the end of the pin to form a protuberance 18', and then a tapered surface portion 18 is formed by gradually decreasing the outer diameter from this protuberance. The angle of slope of the tapered surface 18 of the noncontacting region of the pin is substantially the same as the angle of slope of the sealing surface 13 of the pin. The protuberance 18' has a height such that it does not contact the opposing surface of the noncontacting region of the box when the threaded joint is made up. The height of the protuberance 18', namely, the maximum outer diameter of the tapered surface portion of the noncontacting region of the pin (shown by $\phi a$ in FIG. 4(D)) is preferably such that the gap between it and the opposing surface of the noncontacting region of the box is in the range of 0.2-0.4 mm when the pin and the box are in a made-up state.

In the second embodiment of a threaded joint, the wall thickness of the tapered surface portion 18 of the pin is larger than in the first embodiment shown in FIG. 3(A) which does not have a protuberance, and the area of the shoulder surface 14 at the end of the pin 1 is also increased. As a result, the stiffness of the lip portion and the resistance to compression of the shoulder surface on the end of the pin increases, a large compressive load at the time of make-up can be resisted, and it becomes difficult for plastic deformation to occur at the time of contact or impact of the end of the pin with the end of the box or other object.

The effect of making the tapered surface portion 18 of the noncontacting region of the pin, which has the same angle of slope as the sealing surface, start from the protuberance 18' not only increases the resistance to compression and the stiffness due to the above-described wall thickness of the end of the pin increasing, but it also provides other important effects as described below.

First, as shown in FIG. 4(B), at the start of stabbing of the pin, the tapered surface portion at the end of the pin contacts the female thread of the box and then it contacts the sealing surface of the box which has the same angle of slope. In the same manner as stated with respect to the first embodiment, the sealing surface of the box is prevented from being damaged by the end of the pin, and it becomes easy to align the axes of the pin and the box. In particular, by making the radial gap between the maximum outer diameter of the protruding tapered surface portion and the opposing inner surface of the box a suitable value of 0.2-0.4 mm, the protuberance of the pin becomes a guide for achieving an extremely fine fit, and axial alignment of the pin and the box can be stably and easily achieved at the time of make-up of a joint.

In the second embodiment, the end of the pin is a tapered surface portion having a larger diameter than in the first embodiment. Therefore, when the tapered surface portion of the end of the pin contacts the inner surface of the box, the separation between the pin and the box in the portion inwards of the tapered surface portion of the pin becomes larger compared to the first embodiment. Therefore, the possibility of the end of the pin contacting the sealing surface of the box becomes extremely low, and even if the stabbing angle of the pin considerably deviates from the pipe axial direction, there is no danger of the sealing surface of the box being damaged by the end of the pin.

When the pin further penetrates into the box, the tapered surface portion at the end of the pin reaches the sealing surface of the box. In the same manner as stated with respect to the first embodiment, when the tapered surface portion of the end of the pin contacts the sealing surface of the box, since the sealing surface of the box has the same angle of slope as the tapered surface portion of the end of the pin, contact between the sealing surface of the box and the tapered surface at the end of the pin becomes surface contact, and significant local damage to the sealing surface of the box is avoided. As a result, a decrease in the gastightness of the threaded joint due to contact between the sealing surface of the box and the end of the pin is prevented.

Due to the end portion of the pin undergoing surface contact with the sealing surface of the box, subsequent tightening can be carried out in a state in which the axial directions of the pin and the box are easily aligned with each other. The tapered surface portion of the end of the pin which is in surface contact with the sealing surface of the box serves as a guide for maintaining the stabbing direction of the pin in a suitable direction.

When the tapered surface at the end of the pin reaches the location where it contacts the sealing surface of the box, as shown in FIG. 4(C), the male thread of the pin closest to the end of the pin (as shown in the figure, the male thread in this portion may be in the form of incomplete thread which does not threadingly engage with the female thread) preferably contact the female thread of the box. As a result, make-up of the threaded joint proceeds while the axially aligned state achieved by surface contact between the tapered surface portion on the end of the pin and the sealing surface of the box is maintained with certainty, and make-up becomes even easier.

In the second embodiment, although the wall thickness of the end of the pin is increased, when the shoulder surface at the end of the pin contacts or collides against the end surface of the end of the box or some other member and particularly when it receives an impact in the axial direction, the end portion of the pin may sometimes be plastically deformed and crushed particularly when the inner surface of the end of the pin is chamfered and hence the area of the shoulder surface at the end of the pin is decreased. As a result, as shown in FIG. 4(D), a swollen protrusion 33 is sometimes foamed on the end portion of the pin. However, under the same conditions, the resulting swelling is smaller than in the first embodiment.

Even if the end of the pin deforms so as to produce such swelling, as shown in FIG. 4(D), the radial gap between the pin and box at the end of the pin can be made sufficiently large to contain the swelling, so make-up of the threaded joint can be carried out completely. Compared to the first embodiment, the radial gap between the pin and the box at the end of the pin is smaller by the presence of the protuberance 18', but the stiffness of the end of the pin is increased so that the amount of deformation is reduced, making it possible to adequately cope with deformation of the end of the pin due to impacts which can be assumed.

In this case, as shown in FIG. 4(D), if the outer diameter $\phi b$ of the end of the pin after deformation is smaller than the maximum outer diameter $\phi a$ of the tapered surface portion in the noncontacting region of the pin, make-up of the threaded joint can be carried out without problems even there is deformation of the end of the pin. Accordingly, it can be easily determined whether make-up is possible based on whether or not the maximum outer diameter $\phi a$ of the protuberance provided in the noncontacting region of the pin is larger than the outer diameter $\phi b$ of the portion of the pin which is deformed by impact. In the case of $\phi a > \phi b$, as shown in FIG. 4(D), make-up can be carried out so that the sealing surfaces of the pin and the box completely interfere and gastightness of the threaded joint is guaranteed. In the case of $\phi a < \phi b$, deformation of the end of the pin interferes with the gastightness of the sealing surfaces, and the pin is replaced by a new one.

There are no particular limitations on the length of the noncontacting region of the pin or of the cylindrical surface portion or the tapered surface portion thereof, but the total length of the noncontacting region and the sealing surface of the lip portion is preferably 8-20 mm. As an example, the length of the noncontacting region is approximately 7-14 mm, the length of the cylindrical surface portion is approximately 5-8 mm, and the length of the tapered surface portion which adjoins the end of the pin is approximately 2-6 mm. The wall thickness of the end of the pin is preferably made at least 4 mm in order to give the lip portion adequate stiffness.

Figure 3:
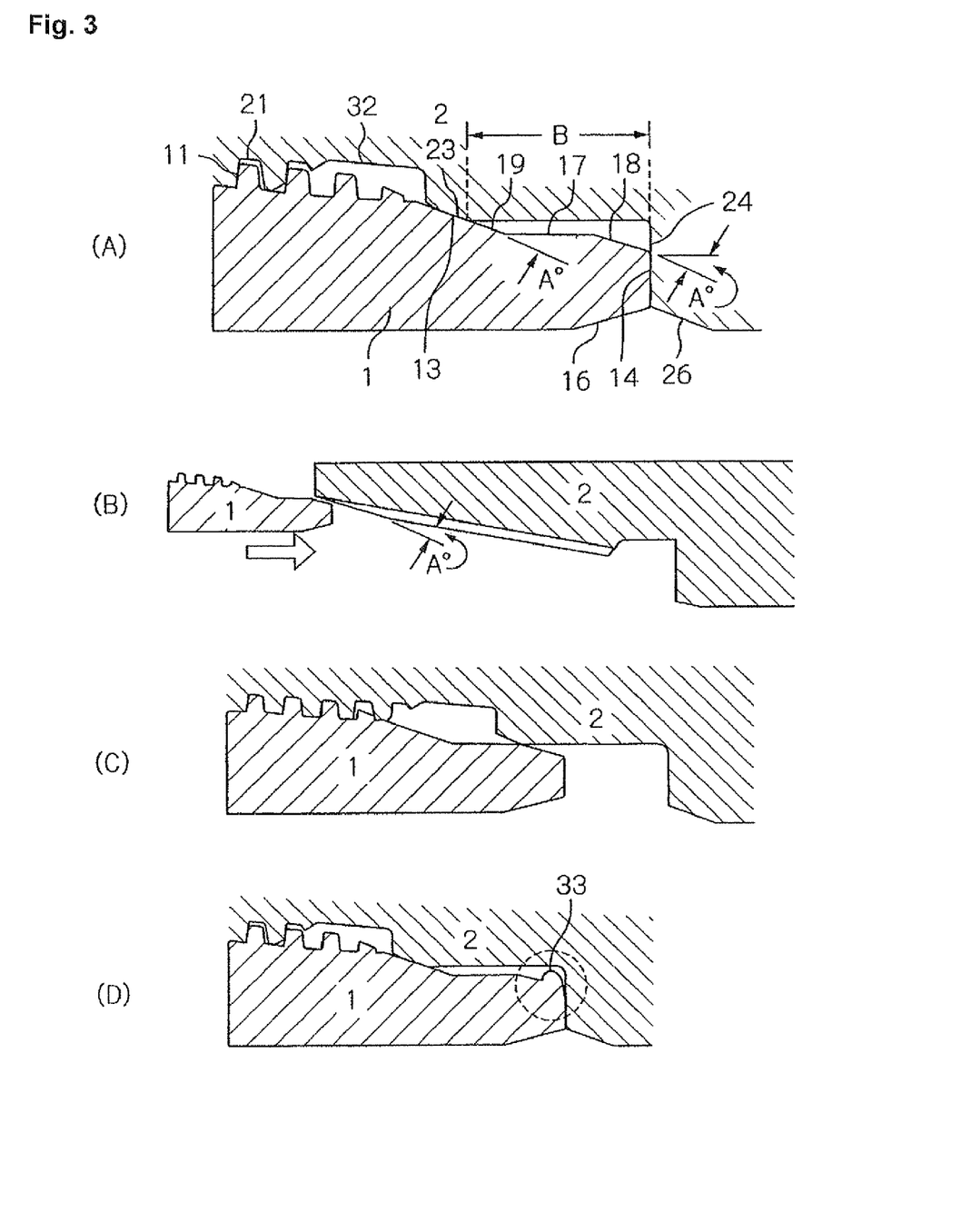
FIG. 3(A) is a schematic axial cross-sectional view of a first embodiment of a threaded joint for steel pipes according to the present invention.
FIG. 3(B) is an explanatory view showing the state at the time of stabbing of the pin of this threaded joint.
FIG. 3(C) is an explanatory view showing the situation when the pin of this threaded joint has been inserted into the box up to a position in which the tapered surface portion at the end of the pin contacts the sealing surface of the box.
FIG. 3(D) is an explanatory view showing the threaded joint of FIG. 3(A) which is made up using a pin which is deformed at its end.
Figure 4:
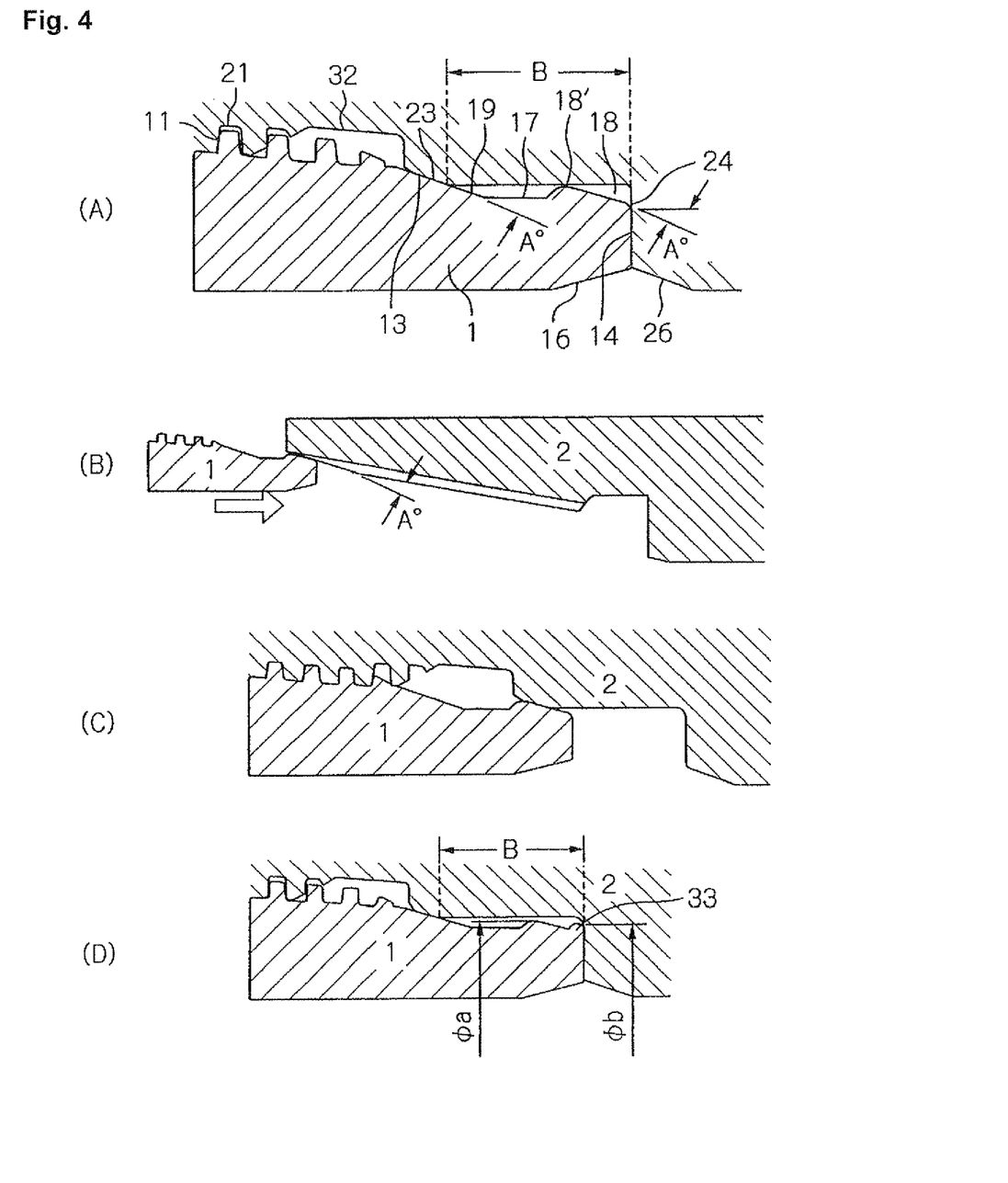
FIG. 4(A) is a schematic axial cross-sectional view of another embodiment of a threaded joint for steel pipes according to the present invention.
FIG. 4(B) is an explanatory view showing the state at the time of stabbing of the pin of this threaded joint.
FIG. 4(C) is an explanatory view showing the state when the pin of this threaded joint has been inserted into the box to a position in which the tapered surface portion at the end of the pin of this threaded joint contacts the sealing surface of the box.
FIG. 4(D) is an explanatory view showing the threaded joint of FIG. 4(A) which is made up using a pin which is deformed at its end.

As shown in FIGS. 3 and 4, the shoulder surface 14 at the end of the pin and the shoulder surface 24 of the box which abuts each other when a compressive load is applied or at the time of make-up may both be perpendicular to the axis of the joint.

The shape of a threaded joint for steel pipes can be otherwise the same as a conventional threaded joint for steel pipes.

For example, the male thread and the female thread of the pin and the box of a threaded joint for steel pipes according to the present invention may be tapered threads like those of a typical conventional threaded joint for steel pipes (such as trapezoidal threads typified by API buttress threads). There have been many proposals concerning the shape of tapered threads for a threaded joint for steel pipes (such as the angle of slope of the stabbing flanks and the load flanks of the thread, the chamfer, the separation between stabbing flanks, the separation between crests and roots, and the radius of curvature of rounded corners), and any of those proposals may be used. For example, a chamfer can be provided on the stabbing flanks of one or both of the male thread and the female threads.

The threaded portions of a threaded joint for steel pipes comprise tapered threads. The crest and root of each thread may be parallel to the taper of the tapered threads, but preferably they are parallel to the axial direction of the joint. With such an arrangement, problems due to deviation of the stabbing angle at the time of make-up in the field can be reduced.

It is not necessary for all the male thread and the female thread to threadingly engage. As shown in FIG. 1(A), the length of the female threaded portion of the box in the axial direction of the joint can be made longer than the length of the male threaded portion of the pin in the axial direction of the joint, and in a made-up state, the female thread in the vicinity of the end of the box can be in a unengaged state in which they do not threadingly engage with the male threads. This makes stabbing of the pin easier.

As shown in FIGS. 2-4, with the object of extending the male thread 11 as close as possible to the sealing surface in the vicinity of the thread, a circumferential groove 32 may be provided in the box, and the male thread closest to the end of the pin may have a shape so as not to threadingly engage with the female thread in the vicinity of the sealing surface. As a result, the stiffness of the lip is increased, and the resistance to compression of the joint is increased. With the same object, the wall thickness of the pin and the box can be increased towards the shoulder surfaces (the inner diameter gradually is decreased) by swaging or building-up.

As shown in FIGS. 2-4, interior chamfers 16 and 26 are preferably formed on both of the shoulder surfaces 14 and 24 of the pin and the box. The chamfers increase the circularity of the periphery of the junction between the pin and the box on the inner surface of a joint for pipes and prevent turbulence of fluid flowing in the interior.

The present invention has been explained above with respect to particular embodiments, but this explanation is only an example and the present invention is not limited to these embodiments.

The invention claimed is:

1. A threaded joint for steel pipes comprising a pin having a male thread, a sealing surface, and an end shoulder surface sequentially arranged from the rear towards the end of the pin, and a box having a female thread, a sealing surface, and a shoulder surface corresponding to the male thread, the sealing surface, and the shoulder surface of the pin, respectively, wherein the threads are tapered threads and the sealing surfaces are tapered surfaces, characterized in that the pin and the box each have a noncontacting region between the sealing surface and the shoulder surface where the peripheral surfaces of the pin and the box do not contact each other, and at least a portion of the noncontacting region of the pin adjoining the end of the pin is a tapered surface portion having substantially the same angle of slope as the sealing surface.

2. A threaded joint for steel pipes as set forth in claim 1 wherein the noncontacting region of the box which opposes the noncontacting region of the pin is constituted by a substantially cylindrical surface.

3. A threaded joint for steel pipes as set forth in claim 2 wherein the noncontacting region of the pin is constituted by a cylindrical surface portion on the side closest to the sealing surface and the tapered surface portion adjoining the end of the pin.

4. A threaded joint for steel pipes as set forth in claim 2 wherein the angle of slope of the sealing surfaces and the tapered surface portion of the noncontacting region of the pin is in the range of 2.5-25°.

5. A threaded joint for steel pipes as set forth in claim 2 wherein the inner peripheral surfaces at the periphery of the shoulder surfaces of the pin and the box are chamfered.

6. A threaded joint for steel pipes as set forth in claim 1 wherein the noncontacting region of the pin is constituted by a cylindrical surface portion on the side closest to the sealing surface and the tapered surface portion adjoining the end of the pin.

7. A threaded joint for steel pipes as set forth in claim 6 wherein the tapered surface portion is formed by gradually decreasing the outer diameter from the end portion of the cylindrical surface portion closest to the end of the pin towards the end of the pin.

8. A threaded joint for steel pipes as set forth in claim 7 wherein the angle of slope of the sealing surfaces and the tapered surface portion of the noncontacting region of the pin is in the range of 2.5-25°.

9. A threaded joint for steel pipes as set forth in claim 7 wherein the inner peripheral surfaces at the periphery of the shoulder surfaces of the pin and the box are chamfered.

10. A threaded joint for steel pipes as set forth in claim 6 wherein the outer diameter increases from the end portion of the cylindrical surface portion on the side closest to the end of the pin towards the end of the pin, and the tapered surface portion gradually decreases in outer diameter from the increased outer diameter.

11. A threaded joint for steel pipes as set forth in claim 10 wherein the difference between the maximum outer diameter of the tapered surface portion of the noncontacting region of the pin and the inner diameter of the noncontacting region of the box in an opposing position is 0.2-0.4 mm.

12. A threaded joint for steel pipes as set forth in claim 11 wherein the angle of slope of the sealing surfaces and the tapered surface portion of the noncontacting region of the pin is in the range of 2.5-25°.

13. A threaded joint for steel pipes as set forth in claim 11 wherein the inner peripheral surfaces at the periphery of the shoulder surfaces of the pin and the box are chamfered.

14. A threaded joint for steel pipes as set forth in claim 10 wherein the angle of slope of the sealing surfaces and the tapered surface portion of the noncontacting region of the pin is in the range of 2.5-25°.

15. A threaded joint for steel pipes as set forth in claim 10 wherein the inner peripheral surfaces at the periphery of the shoulder surfaces of the pin and the box are chamfered.

16. A threaded joint for steel pipes as set forth in claim 6 wherein the angle of slope of the sealing surfaces and the tapered surface portion of the noncontacting region of the pin is in the range of 2.5-25°.

17. A threaded joint for steel pipes as set forth in claim 6 wherein the inner peripheral surfaces at the periphery of the shoulder surfaces of the pin and the box are chamfered.

18. A threaded joint for steel pipes as set forth in claim 1 wherein the angle of slope of the sealing surfaces and the tapered surface portion of the noncontacting region of the pin is in the range of 2.5-25°.

19. A threaded joint for steel pipes as set forth in claim 18 wherein the inner peripheral surfaces at the periphery of the shoulder surfaces of the pin and the box are chamfered.

20. A threaded joint for steel pipes as set forth in claim 1 wherein the inner peripheral surfaces at the periphery of the shoulder surfaces of the pin and the box are chamfered.

* * * * *